US007303224B2

(12) United States Patent
Kim

(10) Patent No.: US 7,303,224 B2
(45) Date of Patent: Dec. 4, 2007

(54) APPARATUS FOR LOCKING A TRUNK OF A VEHICLE

(75) Inventor: Won Kyu Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/295,289

(22) Filed: Dec. 5, 2005

(65) Prior Publication Data

US 2007/0096498 A1 May 3, 2007

(30) Foreign Application Priority Data

Oct. 31, 2005 (KR) ...................... 10-2005-0103392

(51) Int. Cl.
*B62D 25/10* (2006.01)

(52) U.S. Cl. .................. 296/76; 292/DIG. 43; 292/201

(58) Field of Classification Search .................. 296/76; 70/264, 256, 241; 224/924, 324, 326, 321, 224/493, 329; 292/DIG. 43, 201, 216, 314.16, 292/336.3

See application file for complete search history.

(56) References Cited

U.S. PATENT DOCUMENTS

| | | | | |
|---|---|---|---|---|
| 3,640,423 | A * | 2/1972 | Parker et al. | 296/37.6 |
| 4,273,368 | A * | 6/1981 | Tanaka | 292/DIG. 43 |
| 4,893,849 | A * | 1/1990 | Schlack | 292/7 |
| 4,946,215 | A * | 8/1990 | Taylor | 296/37.6 |
| 4,976,477 | A * | 12/1990 | Nakao | 292/201 |
| 5,040,390 | A * | 8/1991 | Mistry et al. | 70/241 |
| 5,642,636 | A * | 7/1997 | Mitsui | 292/DIG. 43 |
| 5,896,705 | A | 4/1999 | Salmonowicz et al. | |
| 6,024,388 | A * | 2/2000 | Tomah et al. | 292/216 |
| 6,048,002 | A * | 4/2000 | Ohta et al. | 292/201 |
| 6,209,366 | B1 * | 4/2001 | Zagoroff | 292/DIG. 43 |
| 6,540,268 | B2 * | 4/2003 | Pauser | 292/48 |
| 6,598,436 | B2 * | 7/2003 | Ponn et al. | 70/256 |
| 2005/0029832 | A1 * | 2/2005 | Verduci et al. | 296/100.06 |

FOREIGN PATENT DOCUMENTS

| | | |
|---|---|---|
| FR | 2096364 | 2/1972 |
| GB | 1067350 | 5/1967 |
| JP | 61-059758 | 3/1986 |
| JP | 62-002770 | 1/1987 |
| JP | 08-296355 | 11/1996 |
| JP | 2000-073640 | 3/2000 |
| KR | 1020020042360 A | 6/2002 |

* cited by examiner

*Primary Examiner*—Kiran B. Patel
(74) *Attorney, Agent, or Firm*—Morgan Lewis & Bockius LLP

(57) ABSTRACT

An apparatus for locking a trunk of a vehicle includes a trunk lid, a driving unit for locking disposed on the trunk lid, a driven unit for locking disposed on the trunk lid, a connecting rod connecting the driven unit to the driving unit, and a support unit supporting the connecting rod to the trunk lid. The support unit includes a guider disposed on the trunk lid and a moving member disposed on the connecting rod and movably disposed on the guider. The driving unit includes a rotatable first lever attached to one end of the connecting rod. The driven unit includes a rotatable second lever attached to another end of the connecting rod.

8 Claims, 3 Drawing Sheets

APPARATUS FOR LOCKING A TRUNK OF A VEHICLE

CROSS-REFERENCE TO RELATED APPLICATION

This application claims priority to and the benefit of Korean Patent Application No. 10-2005-0103392 filed in the Korean Intellectual Property Office on Oct. 31, 2005, the entire contents of which are incorporated herein by reference.

BACKGROUND OF THE INVENTION (a) Field of the Invention

The present invention relates to a trunk of a vehicle, and in particular to an apparatus for locking a trunk of a vehicle.

(b) Description of the Related Art

In general, a trunk of a vehicle is where baggage is accommodated, and the trunk has a manual locking device for preventing the baggage from being stolen.

When a driver inserts a key into a key hole disposed on a rear side of the trunk and turns the key, turning force is transmitted to the manual locking device, and thereby the trunk is opened. However, a conventional manual locking device may have the following problems.

The vehicle vibrates according to conditions of a road while the vehicle is moving. A force transmitting member of the manual locking device interferes with the trunk lid due to the vibration of the vehicle, and thereby a noise may be generated.

In addition, when the trunk lid opens and closes, a noise may be generated by interference between the transmitting member and the trunk lid.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus for locking a trunk of a vehicle having the advantage of reducing noise.

An apparatus for locking a trunk of a vehicle according to an exemplary embodiment of the present invention includes a trunk lid, a driving unit disposed on the trunk lid, a driven unit disposed on the trunk lid, a connecting rod connecting the driven unit to the driving unit, and a support unit for supporting the connecting rod to the trunk lid.

The support unit includes a guider disposed on the trunk lid, and a moving member with a first end disposed on the connecting rod and a second end movably disposed on the guider. The guider is fixed to the trunk lid by a clip. The clip includes an insertion portion with a cone shape, a catch portion formed at an upper end of the insertion portion, and a stop portion disposed apart from the catch portion by a predetermined gap.

A vibration-absorbing member is disposed between the guider and the clip, and prevents vibrations of the guider from transmitting to the clip.

The guider has a circular arc shape of a predetermined angle corresponding to a trajectory of the connecting rod.

The moving member is fixed to the connecting rod by a fixing unit.

The moving member is a shaft that projects from the fixing unit and the guider has a channel such that the moving member is inserted thereinto. A roller is further disposed on the second end of the moving member such that the moving member smoothly moves along the guider's channel.

The driving unit includes a first body fixed to the trunk lid, and a first lever of which an end is rotatably disposed on the first body and another end is connected to an end of the connecting rod.

The driven unit includes a second body fixed to the trunk lid, and a second lever of which an end is rotatably disposed on the second body and another end is connected to another end of the connecting rod.

DETAILED DESCRIPTION OF THE PREFERRED EMBODIMENTS

With reference to the accompanying drawings, embodiments of the present invention will be described. As those skilled in the art will realize, the described embodiments may be modified in various different ways, all without departing from the spirit or scope of the present invention.

Figure 1:
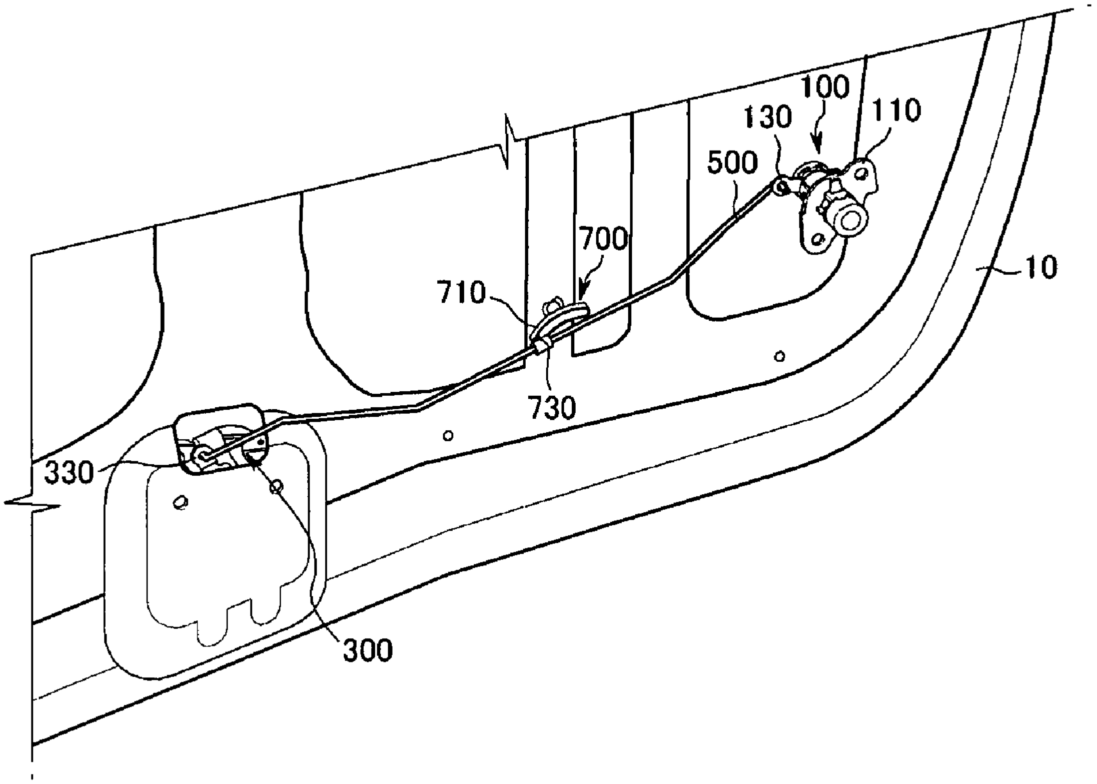
FIG. 1 is a schematic diagram showing an apparatus for locking a trunk of a vehicle according to an exemplary embodiment of the present invention.

An apparatus for locking a trunk of a vehicle according to an exemplary embodiment of the present invention, as shown in FIG. 1, includes a trunk lid 10, a driving unit 100 for locking, a driven unit 300 for locking, a connecting rod 500, and a support unit 700.

The driving unit 100 is disposed on the trunk lid 10, and is positioned corresponding to a key hole (not shown) formed on the trunk lid 10. The driving unit 100 may include a first body 110 fixed to the trunk lid 10, and a first lever 130 of which an end thereof is rotatably disposed on the first body 110 and another end thereof is connected to an end of the connecting rod 500. When a driver inserts a key (not shown) into the key hole (not shown), the key is engaged to the first lever 130. Thereafter, if the driver turns the key, the first lever 130 turns. Accordingly, the first lever 130 pulls the connecting rod 500 connected thereto.

The driven unit 300 is disposed on the trunk lid 10, and is positioned corresponding to a locking loop (not shown) mounted to the vehicle body (not shown). In addition, the driven unit 300 may include a second body 310 fixed to the trunk lid 10, and a second lever 330 of which an end thereof is rotatably disposed on the second body 310 and another end thereof is connected to another end of the connecting rod 500. Furthermore, a latch (not shown) is formed at an end of the second lever 330 so as to engage to the locking loop (not shown) of the vehicle body (not shown). Accordingly, when the connecting rod 500 is pulled by the driving unit 100, the second lever 330 turns, and thereby the latch engaged with the locking loop is disengaged therefrom.

The connecting rod 500 connects the driven unit 300 to the driving unit 100, and transmits force of the driver from the driving unit 100 to the driven unit 300. The length of the connecting rod may vary according to the type of vehicle.

Figure 2:
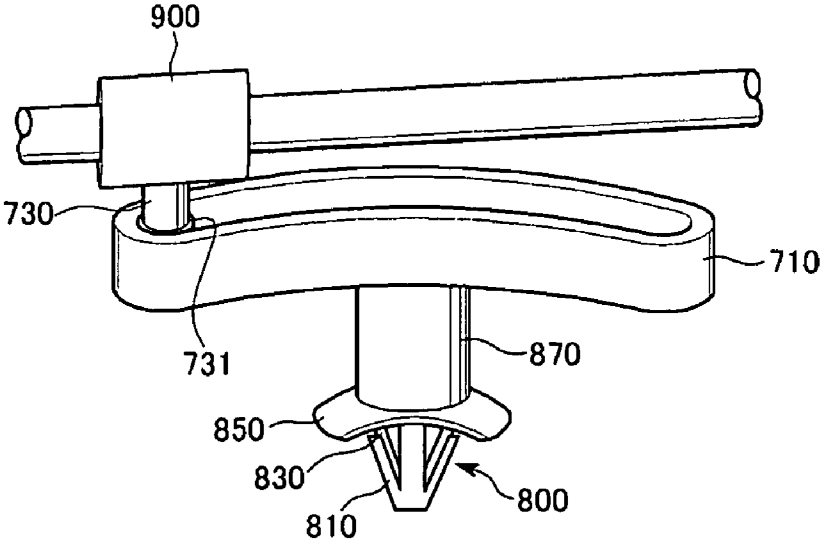
FIG. 2 is a perspective view showing a supporting unit in an apparatus for locking a trunk of a vehicle according to an exemplary embodiment of the present invention.

With reference to FIG. 2, the support unit 700 will hereinafter be described in detail.

The support unit 700 supports the connecting rod 500, and it includes a guider 710 and a moving member 730.

The guider 710 is fixed to the trunk lid 10. In more detail, the guider 710 may be fixed to the trunk lid 10 by the clip 800. Such a clip 800 includes an insertion portion 810 with a cone shape of which a lower end thereof is sharp, a catch portion 830 formed at an upper end of the insertion portion 810, and a stop portion 850 disposed apart from the catch portion 830 by a gap of a predetermined thickness. Accordingly, if the insertion portion 810 is inserted into a mounting hole (not shown) formed at the trunk lid 10, the catch portion 830 is engaged to an interior surface of the trunk lid 10, and the stop portion 850 is positioned to an exterior surface of the trunk lid 10. Consequently, the guider 710 is fixed by the clip 800.

In addition, an apparatus for locking a trunk of a vehicle according to an exemplary embodiment of the present invention may further include a vibration-absorbing member 870 which is disposed between the guider 710 and the clip 800, and which prevents a vibration of the guider 710 from transmitting to the clip 800.

A first end of the moving member 730 is disposed on the connecting rod 500, and a second end of the moving member 730 is movably disposed on the guider 710. In more detail, the moving member 730 may be fixed to the connecting rod 500 by the fixing unit 900. Such a fixing unit 900 has a loop shape that is inserted into an exterior circumference of the connecting rod 500 and is fixed thereto.

In addition, the moving member 730 may be shaped as a shaft projecting from the fixing unit 900. The guider 710 may have a channel such that the moving member 730 is inserted thereinto.

In addition, a roller 731 is disposed on the second end of the moving member 730 such that the moving member 730 smoothly moves along the channel of the guider 710. The roller 731 is configured and dimensioned such that it moves in a state of being in contact with one inner side surface of the channel of the guider 710.

Figure 3:
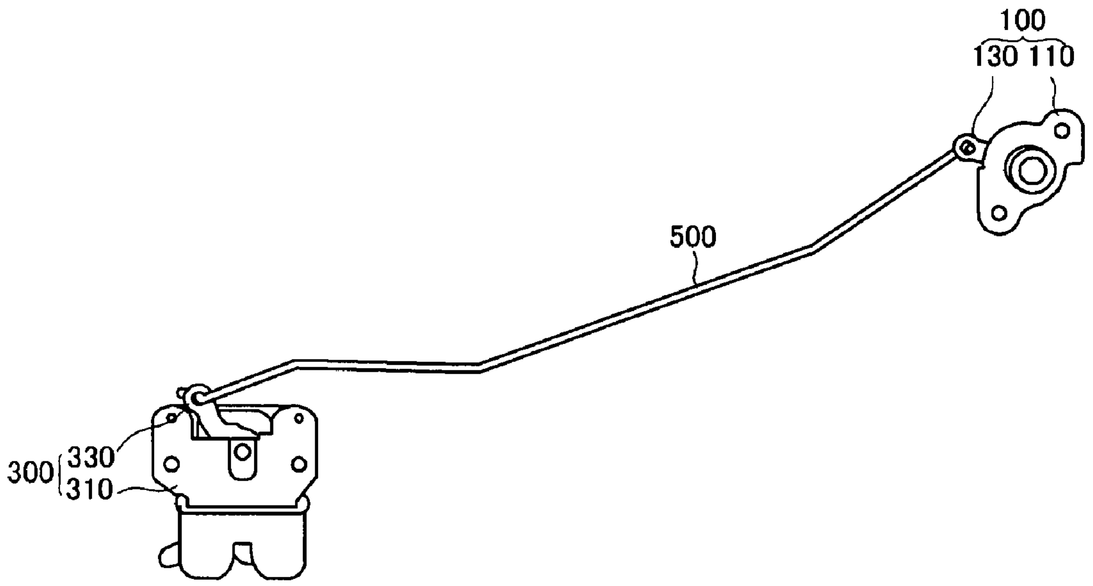
FIG. 3 is a perspective view showing a state in which a driving unit and a driven unit are connected to each other by a connecting rod, in an apparatus for locking a trunk of a vehicle according to an exemplary embodiment of the present invention.
Figure 4:
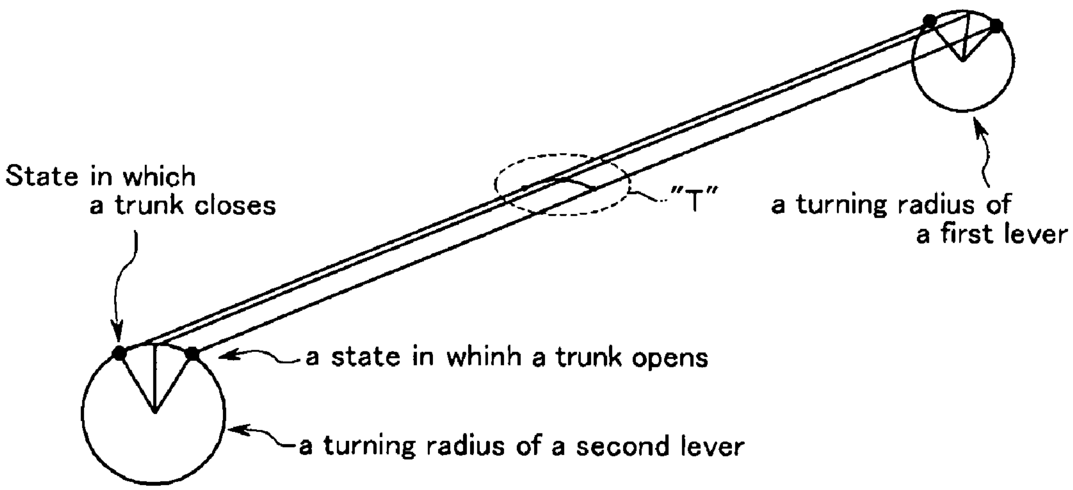
FIG. 4 shows a trajectory of a connecting rod in an apparatus for locking a trunk of a vehicle according to an exemplary embodiment of the present invention.

The guider 710 may, as shown in FIGS. 3 and 4, have a circular arc shape of a predetermined angle corresponding to a trajectory T of the connecting rod 500. Accordingly, the moving member 730 may smoothly move along the guider 710.

Figure 5:
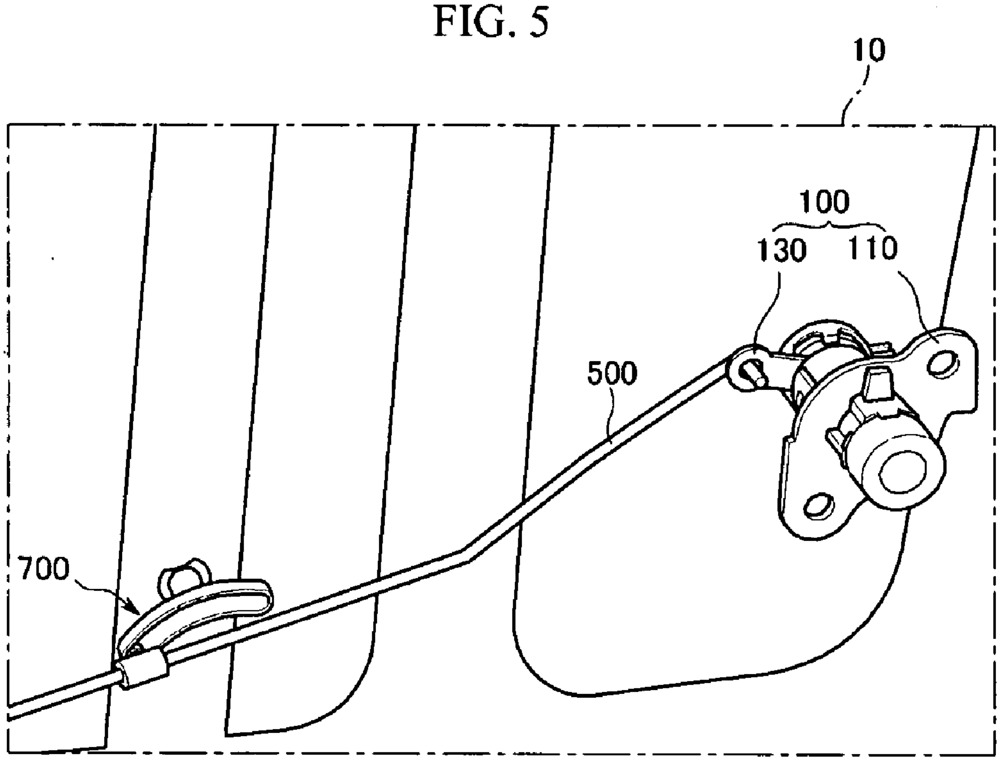
FIG. 5 is a perspective view showing a locked state of principal parts in an apparatus for locking a trunk of a vehicle according to an exemplary embodiment of the present invention.
Figure 6:
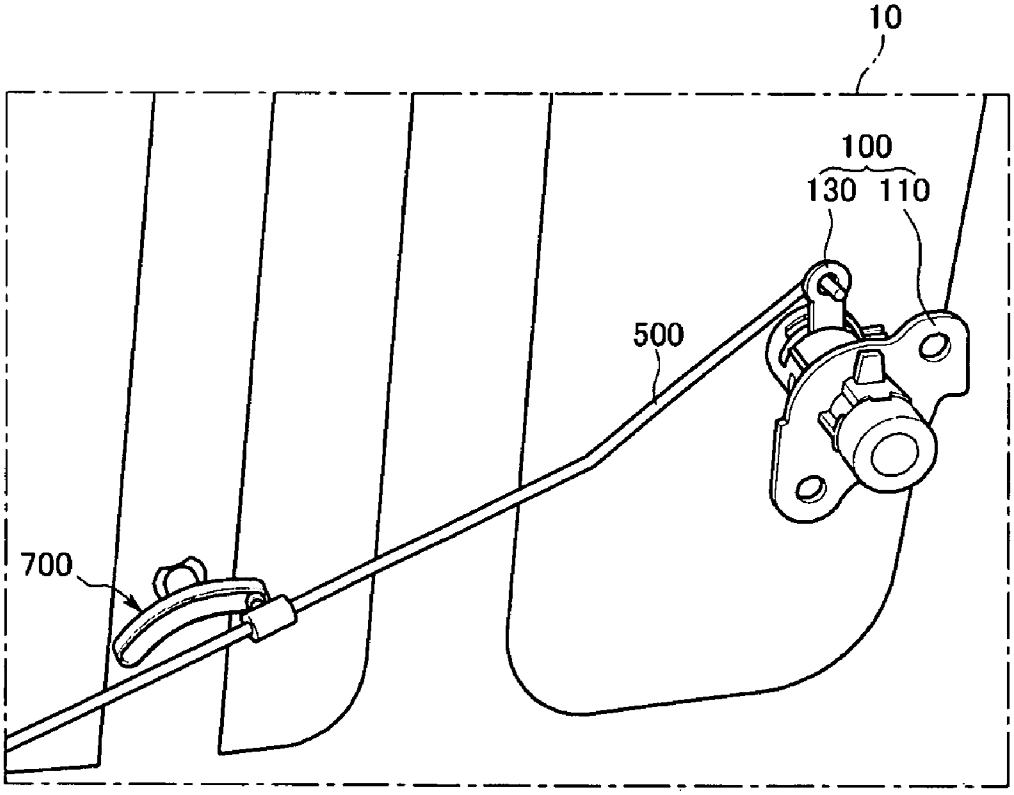
FIG. 6 is a perspective view showing an unlocked state of principal parts in an apparatus for locking a trunk of a vehicle according to an exemplary embodiment of the present invention.

With reference to FIGS. 5 and 6, an operation of an apparatus for locking a trunk of a vehicle according to an exemplary embodiment of the present invention will hereinafter be described in detail.

When the driver inserts the key (not shown) into the key hole (not shown), the key is engaged to the first lever 130. Thereafter, if the driver turns the key, the first lever 130 turns (i.e., changing a state of FIG. 5 into a state of FIG. 6). Accordingly, the first lever 130 pulls the connecting rod 500 connected thereto, and the connecting rod 500 moves along a guide of the supporting unit 700.

In addition, when the connecting rod 500 is pulled by the driving unit 100, as shown in FIG. 3, the second lever 330 turns clockwise, and thereby the latch (not shown) engaged with the locking loop (not shown) is disengaged therefrom.

In addition, since the connecting rod 500 is supported by the supporting unit 700, interference between the connecting rod 500 and the trunk lid 10 due to an exterior impact is not generated.

As has been explained, an apparatus for locking a trunk of a vehicle according to embodiments of the present invention may have the following advantages.

Since a support unit is provided, interference between a connecting rod and a trunk lid due to an exterior impact can be prevented. Consequently, an be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for locking a trunk of a vehicle, comprising:
- a trunk lid;
- a driving unit disposed on the trunk lid;
- a driven unit disposed on the trunk lid;
- a connecting rod connecting the driven unit to the driving unit; and
- a support unit that supports the connecting rod and is disposed on the trunk lid, wherein the support unit comprises:
  - a guider fixed to the trunk lid by a clip; and
  - a moving member of which a first end is disposed on the connecting rod and a second end is movably disposed on the guider;
- wherein the clip comprises:
  - an insertion portion with a conical shape;
  - a catch portion formed at an upper end of the insertion portion; and
  - a stop portion disposed apart from the catch portion by a gap with a predetermined thickness.

2. The apparatus of claim 1, further comprising a vibration-absorbing member which is disposed between the guider and the clip.

3. An apparatus for locking a trunk of a vehicle, comprising:
- a trunk lid;
- a driving unit disposed on the trunk lid;
- a driven unit disposed on the trunk lid;
- a connecting rod connecting the driven unit to the driving unit; and
- a support unit that supports the connecting rod and is disposed on the trunk lid, wherein the support unit comprises:
  - a guider disposed on the trunk lid; and
  - a moving member of which a first end is disposed on the connecting rod and a second end is movably disposed on the guider, wherein the moving member is fixed to the connecting rod by a fixing unit.

4. The apparatus of claim 3, wherein the guider has a circular arc shape that is configured and dimensioned to correspond to a trajectory of the connecting rod.

5. The apparatus of claim 3, wherein:

the moving member is a shaft that projects from the fixing unit; and the guider comprises a channel into which the moving member is inserted.

6. The apparatus of claim 5, wherein a roller is further disposed on the second end of the moving member.

7. An apparatus for locking a trunk of a vehicle, comprising:

a trunk lid;

a driving unit disposed on the trunk lid;

a driven unit disposed on the trunk lid;

a connecting rod connecting the driven unit to the driving unit; and a support unit that supports the connecting rod and is disposed on the trunk lid;

wherein the driving unit comprises:

a first body fixed to the trunk lid; and a first lever of which a first end is rotatably disposed on the first body and a second end is connected to a first end of the connecting rod.

8. The apparatus of claim 7, wherein the driven unit comprises:

a second body fixed to the trunk lid; and a second lever of which a first end is rotatably disposed on the second body and a second end is connected to a second end of the connecting rod.

* * * * *